April 13, 1943.　　　M. J. FINNEGAN　　　2,316,682
LANDING GEAR CONTROL SYSTEM
Filed May 31, 1941　　　2 Sheets-Sheet 2

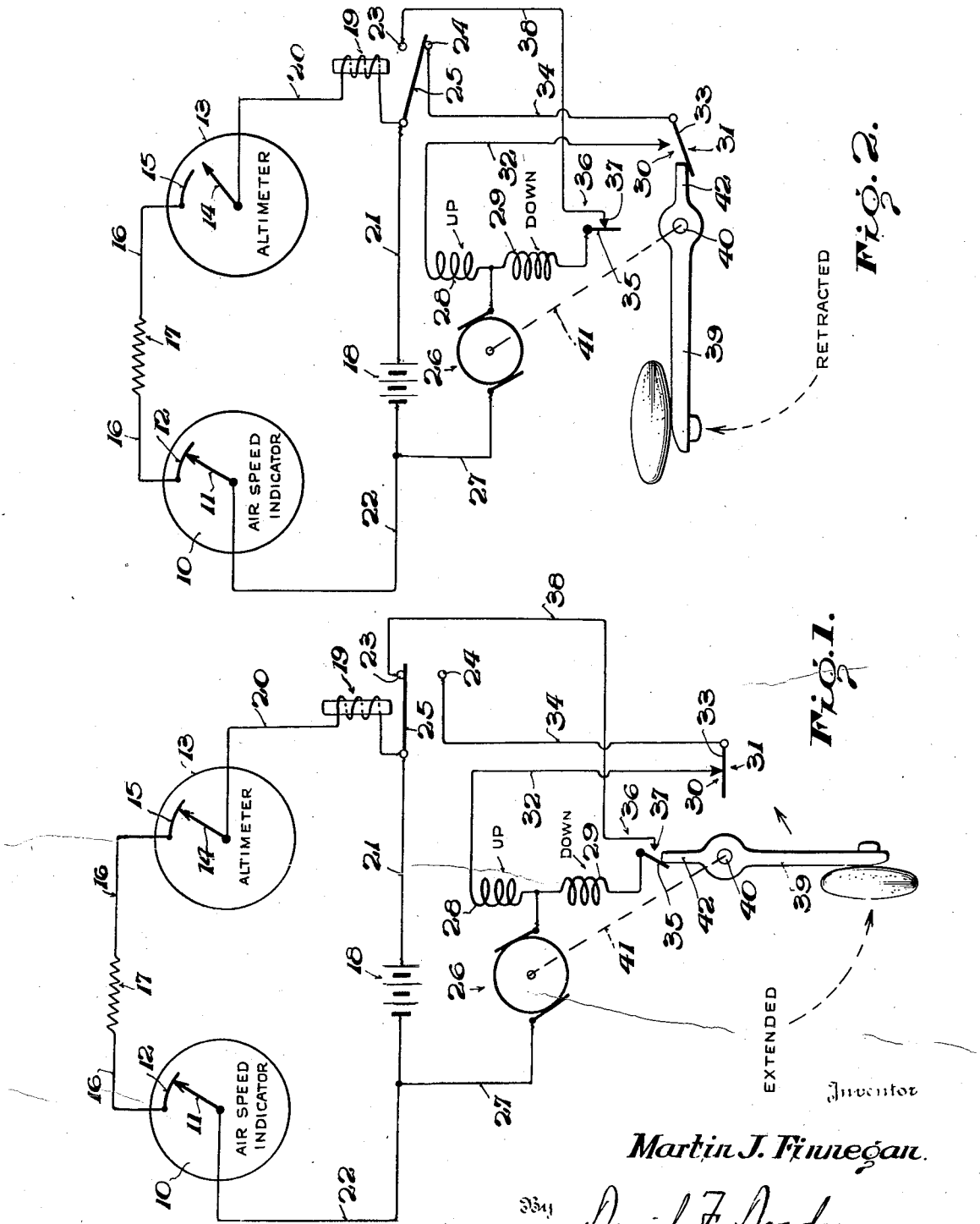

Inventor
Martin J. Finnegan
By David F. Doody
Attorney

Patented Apr. 13, 1943

2,316,682

UNITED STATES PATENT OFFICE 2,316,682

LANDING GEAR CONTROL SYSTEM

Martin J. Finnegan, Glen Rock, N. J., assignor to Bendix Aviation Corporation, South Bend, Ind., a corporation of Delaware Application May 31, 1941, Serial No. 396,149

3 Claims. (Cl. 244—102)

This invention relates to the control of the landing gear of aircraft, and more particularly to a system for automatically positioning the landing gear in accordance with certain flight indications.

One of the hazards of flight in craft with retractable landing gear has been the possibility of landing with the wheels retracted, due to the forgetfulness of the pilot, or to his preoccupation with the many flight questions involved during a landing maneuver.

It is an object of the present invention to provide a system automatically operated in response to certain flight conditions to extend the retracted landing gear of an aircraft.

It is another object of the invention to provide a means incorporated into certain standard flight instruments for controlling the operation of a landing gear motor.

Other objects include the provision of a system automatically responsive to predetermined safe flying conditions for maintaining the gear of an aircraft retracted, and for extending the gear upon the variation from safe condition of certain flight factors.

Additional objects will appear from a study of the following specification when made in conjunction with the attached drawings, throughout which like numerals designate like parts.

Fig. 1 is a circuit diagram of one embodiment of the present invention, showing the landing gear of an aircraft extended.

Fig. 2 is a showing of the same circuit with the landing gear in retracted position.

Figure 3:
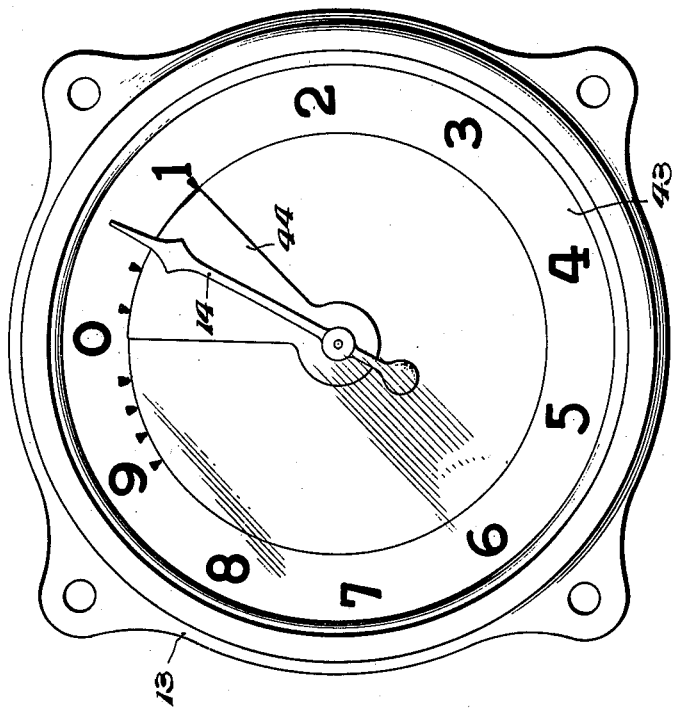
Fig. 3 is a plan view of a flight instrument incorporating a novel feature of the present invention.

In accordance with the present invention, contact means are provided between the pointer and scale of an air speed indicator and of an altimeter for completing a circuit when altitude and air speed indications lie within a certain range, for extending, and maintaining extended, the landing gear of the aircraft. Novel circuit means are provided for automatically retracting the extended gear, and maintaining it retracted, when the indications of either altitude or air speed exceed a predetermined minimum safe value for level flight.

Having particular reference to Figs. 1 and 2, 10 represents an air speed indicator, having a pointer 11 and a contact member 12 extending in an arc for a portion of the circumference of the air speed indicator. An altimeter 13, having a pointer 14, movable with respect to a contact strip 15, is connected in series with contact member 12 through a conductor 16 and a current limiting resistor 17. A battery 18 provides electrical energy for energizing a relay 19, which is connected to the pointer 14 of altimeter 13 by means of a conductor 20, and to battery 18 through a conductor 21, while battery 18 is connected in series to the pointer 11 of air speed indicator 10 by means of a conductor 22.

Relay 19 has a front contact 23, a back contact 24, and an armature 25. A landing gear operating motor 26 has one side of its armature connected to battery 18 through conductor 27, and has the other side of its armature connected to one end of two oppositely wound series fields 28 and 29. The other end of series field 28 is connected to the stationary pole 30 of a limit switch 31 through a conductor 32, and switch blade 33 of limit switch 31 is connected to back contact 24 by means of a conductor 34. The other end of field 29 is connected to the switch arm 35 of a limit switch 36, and front contact 23 is connected to the stationary contact 37 of limit switch 36 through a conductor 38.

As shown in Fig. 1, the landing gear strut 39, which is pivoted at 40, is connected, by means of any suitable shaft 41, to the armature of motor 26 in the conventional manner. Strut 39 carries a projecting finger 42, which, as shown in Fig. 1, engages switch arm 35 to open the circuit of field 29 when the gear is in the extended position, and as shown in Fig. 2, finger 42 engages switch blade 33 to open limit switch 31 and the circuit of field 28 when the landing gear is in the retracted position.

Figure 4:
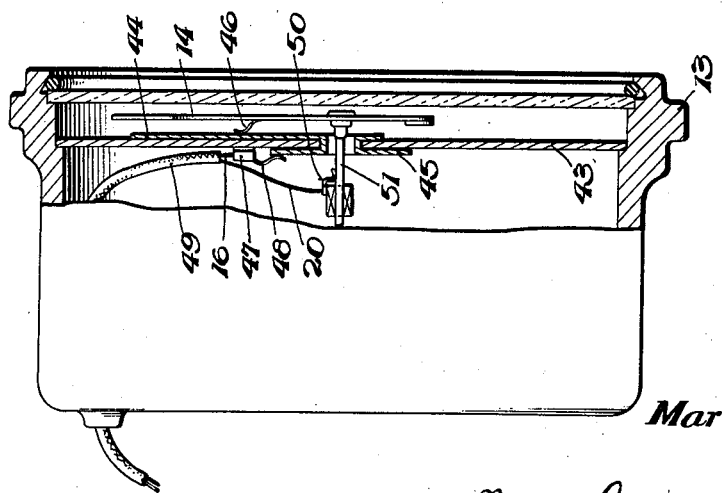
Fig. 4 is an elevational view, partly in section, of the instrument shown in Fig. 3.

Figs. 3 and 4 show one means whereby an altimeter and an air speed indicator may have contact members embodied therein for use with the novel system of the present invention. The instrument shown in Figs. 3 and 4 will be described as an altimeter, but it will be understood that the description is equally applicable to an air speed indicator, since the contact means to be described is the same for each instrument.

Altimeter 13 has a scale member 43, which, in the present instance, may be of non-conducting material, such as "Bakelite," bearing indications of altitude in thousands of feet. A metal sector 44, extending through the angular measure between zero and one thousand feet, is held upon scale member 43 in a sliding friction fit, by means of a circular flange portion 45 that lies behind scale member 43. Pointer 14 carries a suitable brush member, such as a hair spring 46, which contacts lightly with metal sector 44. On its back face, scale 43 carries a terminal member 47, which may be secured in any ordinary way thereto, and a brush member 48 extends therefrom and makes contact with circular flange member 45. Terminal member 47 connects with insulated conductor 16, carried in a conduit 49 along with insulated conductor 20, which is electrically connected by means of a suitable brush member 50 to the metal shaft 51 carrying pointer 14. By this construction, whenever pointer 14 lies between 0 and 1 on scale 43, brush member 46 is in contact with metal sector 44, and it will be readily seen that a closed electrical circuit is thus provided. Whenever pointer 14 lies outside of the 0 and 1 designations of scale 43, brush member 46 is out of contact with sector 44, and therefor, the electrical connection within altimeter 13 is broken.

By means of the present invention, a pilot may completely forget to extend his landing gear prior to landing, but whenever his air speed falls below a minimum safe air speed, such as eighty miles an hour, and when his altitude falls below that safe for sustained level flight, for example, one thousand feet, then, by means of the circuit shown in Fig. 1, motor 41 is operated to extend the landing gear as shown in Fig. 1, and upon complete extension, the motor circuit is opened by the engagement of finger 42 with the limit switch 36. It should be noted that when the craft's altitude is in excess of one thousand feet, and the air speed is below the safe minimum value, the landing gear will not be extended, since the relay circuit will be opened by pointer 14. It is the two factors of air speed and altitude, which, in combination, determine the necessity of extending the landing gear, and if the air speed falls below eighty miles an hour, and the pilot still has altitude in excess of one thousand feet, the craft can be dived to increase the air speed to a safe value, or increased power may be delivered sufficient to re-establish a safe air speed prior to loss of altitude below one thousand feet.

When the aircraft takes off, the pilot need not be concerned with retracting the landing gear, since the establishment of an air speed in excess of the safe minimum, even though the altitude is considerably less than a thousand feet, will cause the relay circuit to be de-energized, due to the open circuit at the pointer 11, and as armature 25 falls upon contact 24, the "up" field 28 is energized to retract the landing gear to the position shown in Fig. 2, and once the fully retracted position is attained, finger 42 opens the motor circuit at limit switch 31 by engagement with switch blade 33.

Sector 44 may be designed to extend through any desired angle on the air speed indicator and on the altimeter, and eighty miles an hour and one thousand feet have, of course, been chosen as arbitrary examples of minimum safe limits of air speed and altitude.

The landing gear control above described is completely electrical, but it will be understood, without more specific illustration, that the circuit may operate a hydraulic servo system for doing the actual extension and retraction of the landing gear. Likewise, the electrical means, if employed, may assume different form, such as the use of differently constituted motor elements and motor reversing means.

While only one embodiment of the present invention has been shown in the drawings, it is to be understood that various changes may be made without departing from the scope of the present invention. For this reason, it is intended not to limit the invention by the description herein given as an example, but solely by the scope of the appended claims.

I claim:

1. A mechanism for controlling the operation of landing gear comprising a source of electrical energy, a motor energizable therefrom, a switch for closing the energizing circuit for said motor, and a circuit in parallel to the first mentioned circuit including in series, an altimeter, an air speed indicator, a solenoid and said source of electrical energy, and contact means on said altimeter and said air speed indicator, each extending over a predetermined range of indications for actuating said solenoid to close said switch, thus energizing said motor.

2. In a system for controlling the retraction and extension of the landing gear of an aircraft, the combination of an altimeter, an air speed indicator, contact means on said altimeter and said indicator extending over predetermined indicated values of altitude and air speed, a landing gear motor, circuit connections between said motor and said altimeter and air speed indicator, contact means for extending the landing gear when the indications of both said altimeter and said air speed indicator come within said predetermined values and other circuit connections operative upon the exceeding of said predetermined values of either said altimeter or said air speed indicator for operating said motor to retract the landing gear.

3. In a system for controlling the extension and retraction of the landing gear of aircraft, a motor for extending and retracting landing gear, an altimeter, an air speed indicator, contact means for maintaining a closed circuit condition through said altimeter and said air speed indicator over predetermined indicated values of altitude and air speed, series connections between said altimeter, said indicator and said motor, whereby when the indication of said altimeter and said air speed lie within said predetermined values, said motor will maintain the landing gear extended, and additional circuit means, responsive to indications of said altimeter or of said air speed indicator exceeding said predetermined values, for operating said motor to retract the landing gear.

MARTIN J. FINNEGAN.